United States Patent

[11] 3,548,917

| [72] | Inventor | Herbert Greenewald, Jr.<br>Columbus, Ohio |
|---|---|---|
| [21] | Appl. No. | 715,785 |
| [22] | Filed | Mar. 25, 1968 |
| [45] | Patented | Dec. 22, 1970 |
| [73] | Assignee | North American Rockwell Corporation<br>Division of Ser. No. 703,206, Jan. 11, 1968. |

[54] MOLD MANUFACTURING APPARATUS
1 Claim, 5 Drawing Figs.

[52] U.S. Cl. .................................................. 164/170, 164/37
[51] Int. Cl. ............................................... B22c 15/08
[50] Field of Search ........................................ 164/170, 171, 409, 37, 183, 224, 209, 165

[56] References Cited
UNITED STATES PATENTS

| 2,887,741 | 5/1959 | Sabel | 164/338X |
| 3,147,519 | 9/1964 | Hilliard, Jr. | 164/165 |
| 2,807,845 | 10/1957 | Sawyer | 164/37 |
| 2,882,566 | 4/1959 | Redhead | 164/170 |
| 2,973,562 | 3/1961 | Miller | 164/170 |

FOREIGN PATENTS

| 631,220 | 12/1961 | Italy | 164/170 |

Primary Examiner—Charles W. Lanham
Assistant Examiner—R. Spencer Annear
Attorneys—William R. Lane and Daniel H. Dunbar ABSTRACT: Apparatus for manufacturing mold elements for metal casting wherein a mold composition consisting of refractory in powder form and thermosetting resin may be advantageously formed to shape in a closed cavity by the steps of mass compaction above a minimum pressure level and concurrent resin-curing at an elevated temperature. The apparatus utilizes an inverted die with a heated cavity and pressurized diaphragm means positioned below the cavity for injecting the composition into the die and simultaneously initiating mass compaction with resin curing.

PATENTED DEC 22 1970
3,548,917
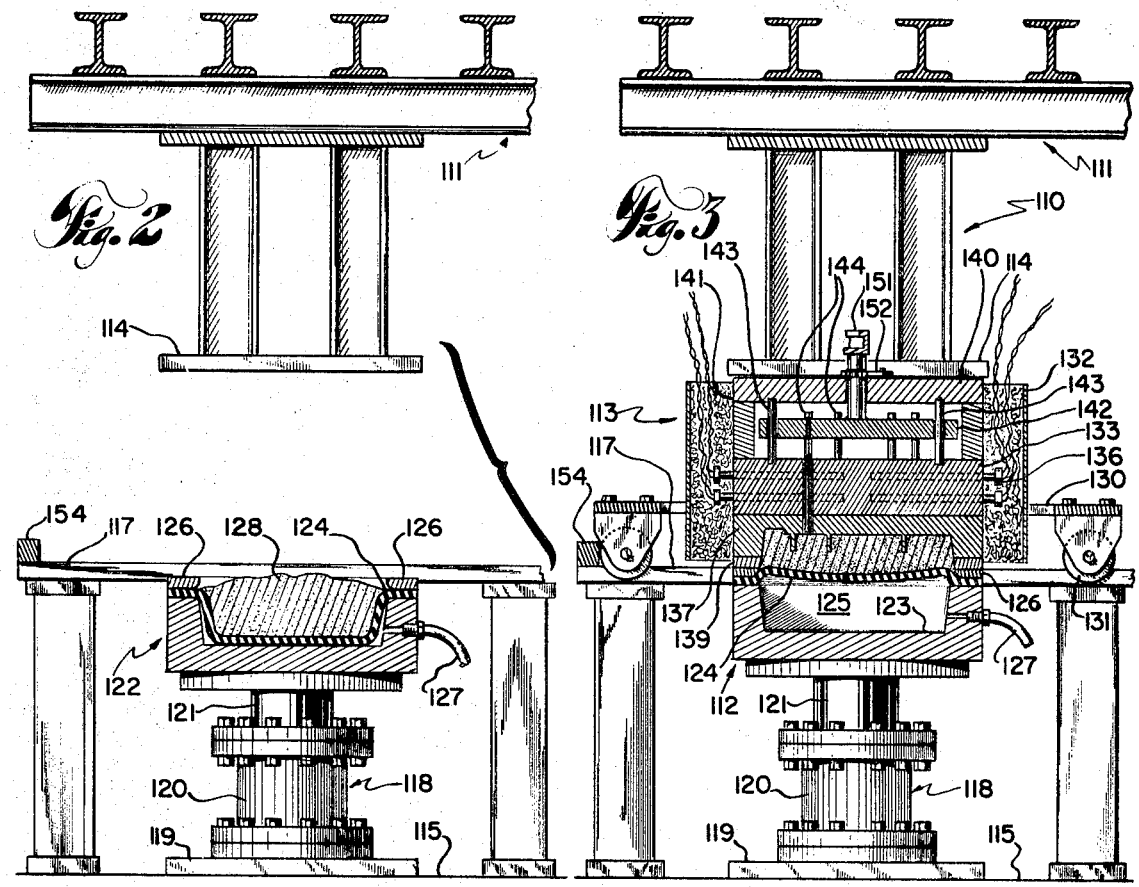
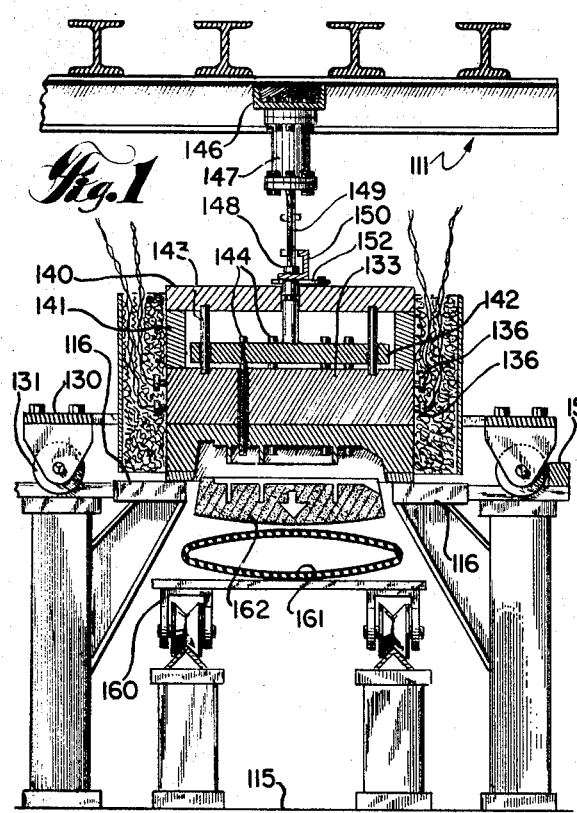
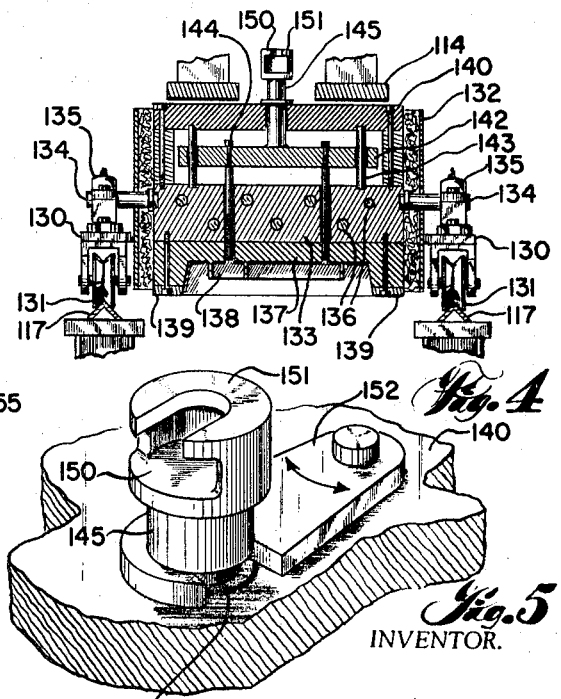
INVENTOR.
HERBERT GREENEWALD, JR.
BY
ATTORNEY

MOLD MANUFACTURING APPARATUS

CROSS-REFERENCE

This application is a division of pending application Ser. No. 703,206, filed Jan. 11, 1968 and assigned to the assignee of this application.

SUMMARY OF THE INVENTION

A mold composition consisting of refractory in finely powdered form and thermosetting resin is shaped in a closed cavity to develop a mold surface of desired casting surface configuration by the steps of mass compaction to a pressure level above approximately 100 p.s.i. throughout and concurrent resin-curing at a temperature substantially above ambient temperatures. To obtain optimum properties in the completed mold it is important that the required simultaneous mass compaction and curing be accomplished without appreciable heating of the resin prior to initiating sustained mass compaction of the refractory particles. The apparatus of this invention permits such to be accomplished in minimum time by using a heated die that has an interior cavity with the mold element configuration and that is placed over a loading station in an inverted condition. The particulate composition is placed on a flexible diaphragm in the loading station but in noncontracting relation to the heated die cavity. The die and work station are clamped after being aligned and pressurized fluid is supplied to one side of the diaphragm through a cooperating plenum to inject the mold material into the mold cavity and simultaneously initiate both resin curing and mass compaction. Such precludes undesirable premature resin heating without an incurred time penalty due to sequential subsequent die heating. Ejection means may also be included in the apparatus to effect removal of the completed mold element after substantially complete curing. After the mold element has been formed and ejected, it may be fired in a nonoxidizing atmosphere at an elevated temperature a sufficient time to develop improved properties in the completed mold element.

DESCRIPTION OF THE DRAWINGS

FIGS. 1 through 4 are partially sectioned elevational views of apparatus in accordance with this invention for making large solid mold elements; and FIG. 5 is a perspective view detailing a coupling and locking mechanism for controlling mold ejection pin actuation in the apparatus of FIGS. 1 through 4.

DETAILED DESCRIPTION

Apparatus

The apparatus of the instant invention is operated to practice a basic step wherein a mold composition essentially comprised of refractory powder and thermosetting resin binder ingredients is subjected to compression above a specified minimum level in a mass compaction sense concurrent with and substantially throughout the period of composition binder curing to thereby develop significantly increased compressive strengths, improved mold surface definition, and better dimensional tolerances and shape stability, particularly with reference to a subsequent carbon-bonded particle condition of the completed mold. The term "mass compaction" as it is used herein is intended to mean that the mold composition (1) is completely confined in a spatial sense relative to the desired core configuration, and (2) additionally, is simultaneously subjected to a pressure condition that is above a prescribed uniform minimum pressure level of approximately 100 p.s.i. throughout its spatial extent. The apparatus detailed in FIGS. 1 through 5 of the drawings is particularly suited for use in developing the required confinement and mass compaction during curing in mold cores, mold halves, and the like having configurations that are solid and comparatively large. Conventional core molding equipment such as jolters, impactors, sandblowers, and the like do not develop the mass compaction necessary to the practice of this invention.

As shown in the drawings, the apparatus is referenced generally as 110 and is comprised in part of a framework 111 made of conventional structural members and having multiple work stations. In addition, apparatus 110 includes a compression loading assembly 112 and a movable die assembly 113. The framework 111 includes an up-stop portion 114 that is fixed relative to floor support 115 and relative to the other parts of the framework. A down-stop 116 is included in assembly 111 as well as the rails 117 for supporting die assembly 113. The assemblies designated 111 and 112 function in the manner of a press wherein work is accomplished at the region of die assembly 113.

Compression loading assembly 112 is illustrated in two successive operating conditions in FIGS. 2 and 3. Such assembly includes a clamping actuator 118 supported by base 119 and having a cylinder 120 and piston 121 that cooperate with loading head 122. Head 122 includes a rigid housing 123 and flexible diaphragm 124 that define a plenum chamber 125. A clamping ring 126 secures diaphragm 124 to housing 123 in a conventional manner. Depending on desired curing temperatures, diaphragm 124 may be fabricated of Buna-N or silicone rubber. Evacuation/pressurization line 127 cooperates with plenum chamber 125. In the FIG. 2 illustration, plenum 125 is evacuated by valving a vacuum condition from a conventional vacuum source (not shown) through line 127. Mold composition 128 at ambient temperature is placed into loading head 112 in the FIG. 2 condition for subsequent injection into an inverted mold cavity included in die assembly 113. In the FIG. 3 illustration, an elevated pressure condition (e.g., air at 250 p.s.i.) is introduced into plenum 125 through line 127 to force the preloaded mold composition into die assembly 113 to obtain mass compaction concurrent with immediately initiated resin-curing at the elevated temperature of the die.

Die assembly 113 is movably carried by carriage 130 having the wheel elements 131 that engage rails 117. Carriage 130 rotatably supports frame 132 having the die support 133 secured thereto. Frame 132, connected die support 133, and the various elements secured to die support 133 are rotatably carried on carriage 130 by the trunnions 134 and pillow block bearings 135 shown in FIG. 4. Die support 133 includes inserted cartridge-type resistance heater elements 136 that are connected by appropriate leads to a conventional electrical energy power supply (not shown). The lowermost surface of die support 133 (in its FIGS. 1 and 3 condition) contacts a flat exterior surface of the metallic die 137 for effecting efficient heat transfer. The surface of cavity 138 is provided with a configuration, generally machined, that corresponds to the shape or contour desired for the casting surface of the mold element to be formed. Metallic die 137, which is usually nickel-plated brass or bronze, is secured to die support 133 by framelike die holder 139 and by conventional threaded fastener devices (not shown). The upper portion of die assembly 113 includes a back pressure plate 140 that cooperates with spacer frame 141 and that is secured in position by conventional threaded fastener devices (not shown) cooperating with die support 133. An ejection plate 142 that cooperates with guide pins 143 and that carries ejection pins 144 is provided within the space defined in part by spacer 141. When the ejection plate rod 145 is placed in a raised condition (FIG. 3), ejection pins 144 are fully retracted from within die cavity 138. When ejection plate 142 is actuated to a lowered condition (FIG. 1), ejection pins 144 project through cooperating passageways in die support 133 and die 137 and into die cavity 138 a sufficient distance to eject a completed mold element from the die assembly.

Apparatus details for actuating ejection plate 142 are shown in part in FIG. 1 and in part by FIG. 5. Cross-beam 146 is secured to framework 111 and carries conventional actuator 147 having a piston head 148 at the free end of rod 149. Piston head 148 and rod 149 engage the slot and recess region 150 provided in coupling member 151. Member 151 is preferably rotatably attached to the free end of ejection plate rod 145. See FIG. 5. A rotatable latch 152 carried by pressure plate 140 is arranged to engage the recessed groove 153 in rod 145 to retain ejection plate 142 and ejection pins 144 in the FIG. 3 nonprojecting relation to die cavity 138 during the mold-forming steps.

Stops 154 and 155 are secured to rails 117 to properly position die assembly 113 at the different work stations for apparatus 110. The work station illustrated in FIG. 1 is adjacent the work station illustrated in FIGS. 2 and 3 and is used primarily in connection with die assembly preparation and mold ejection. The die assembly is moved from the FIG. 1 position along rails 117 to the work station illustrated in FIGS. 2 and 3 for mold material injection and for concurrent mass compaction and resin-curing. The step required for charging compression loading assembly 112 with the material charge 128 precedes both the positioning of die assembly 113 over loading head 122 and the subsequent clamping of the entire assembly by clamping actuator 118. Transfer equipment 160 (FIG. 1) may be provided for transferring the completed mold assembly from apparatus 110 for subsequent processing. Also, a conventional inflatable cushion 161 may be provided to minimize the possible damaging of the completed mold assembly during ejection from assembly 113.

Method

FIG. 3 of the drawings illustrates the required simultaneous mass compaction and curing method steps of this invention as related to the apparatus of FIGS. 1 through 5. FIGS. 1 and 2 illustrate apparatus conditions preparatory to and following the concurrent mass compaction and curing. Die assembly 113, while being maintained with its die member in a heated condition at the desired elevated temperature for curing the old composition being used, is prepared for subsequent material loading at the apparatus work station illustrated in FIG. 1. During preparation the assembly portions fixedly secured to frame 132 and die support 133 are preferably rotated on trunnions 134 to an inverted condition relative to the condition shown in the drawings. Ejection pins 144 are moved to a fully retracted condition (FIG. 3) and locked in place by latch member 152. The surface 138 of the cavity in die 137 is normally coated with a conventional mold release agent such as a wax or silicone oil prior to subsequent material loading.

Plenum chamber 125 is evacuated to place rubber diaphragm 124 in its FIG. 2 retracted position and a predetermined quantity of uncured mold composition material 128 at room or ambient temperature is placed in loading head 122. Loading head 122 and the material are both positioned to have slight clearance below the lowermost surface of die holder 139. Die assembly 113, with heated die support 133 and heated die 137 in their inverted FIG. 1 condition, is moved along rails 117 to the apparatus work station illustrated by FIGS. 2 and 3. Clamping actuator 118 is activated to raise loading head 122 and clamp the die assembly elements connected to die support 133 against up-stop portion 114 of framework 111. It is required that the clamping force developed by actuator 118 and applied to loading head 122 exceed the reaction force that is subsequently developed when plenum chamber 125 is pressurized by means of evacuation/pressurization line 127. It is common that a gas pressure of approximately 250 p.s.i.g. be introduced into chamber 125 to accomplish both injection of the composition into the cavity of die 137 and mass compaction of the so-injected material during curing; the clamping force developed by actuator 118 is commonly based on a pressure equivalent of 50 p.s.i.g. above the pressure condition introduced in plenum 125 for the projected area involved.

Curing of mold material 128 commences with the injection of such material into preheated cavity 138 by the action of diaphragm 124 and continues during the period of continued mass compaction. With respect to the hereinafter detailed zircon powder and catalyzed phenolic thermosetting resin mold compositions, a die temperature in the general range of 400° F. to 500° F. has been utilized concurrent with mass compaction at 250 p.s.i. for a period of time varying from 20 to 40 minutes to obtain the required curing. In the case of the example zircon powder and acid-catalyzed furfuryl alcohol thermosetting resin mold compositions, die 137 has been maintained at a temperature in the range of 150° F. to 220° F. for periods of time ranging from 25 minutes to 50 minutes, both at the mass compaction pressure of 250 p.s.i.g. or above, to obtain the desired curing prior to firing. As previously indicated, mass compaction pressures of less than approximately 100 p.s.i. are considered unsatisfactory for the purposes of this invention.

After the mold element is substantially cured, the mass compaction pressure developed through bladder 124 and the clamping force developed by actuator 118 are released and die assembly 113 is moved from the work station of FIGS. 2-—3 to the work station illustrated by FIG. 1 for ejection purposes. Mold ejection is accomplished by activating actuator 147 to force ejection plate 142 and ejection pins 144 downward to their illustrated FIG. 1 position. Such actuation forces cured mold element 162 from die assembly 113 for subsequent processing. As previously indicated, the added step involves firing the cured mold element in a nonoxidizing (vacuum or inert gas atmosphere) to an elevated temperature generally in the range of approximately 1000° F. to 1300° F. a sufficient time to form a carbonaceous bond as between the included refractory particles. Apparatus for accomplishing this step is conventional and therefore is not shown in the drawings.

Composition

In order to provide mold elements that are particularly well suited without further surface machining or the like for use in casting comparatively large, precisely-dimensioned, smooth-surfaced, thin-walled metal parts of an aluminum alloy of the like, a preferred composition is utilized in connection with the above-described apparatus and method to develop required mold compressive strengths and other desirable core properties in the completed end products. For this purpose the following core composition mixture is preferred:

| Ingredient: | Parts by weight |
|---|---|
| Refractory powder | 100 |
| Catalyzed thermosetting resin | 3–10 |

As used herein, the term "refractory powder" means a refractory form that has a flourlike consistency or feel similar to general purpose milled food grains (e.g., wheat, rye, etc.) or cosmetic powders and that generally corresponds to −200 mesh (commercial standard) or finer in fineness. Such powder form is readily distinguishable from conventional core refractory forms such as known core sands by the consistency quality and generally also by the fineness quality. As to chemical form, it is necessary that the refractory powder be physically and chemically stable at the molten metal casting temperatures to be encountered and be chemically nonreactive with the resin catalyst system used. Generally, oxide, carbide, silicate, and even complex molecule forms of the refractory are suitable for most applications of this invention. Aluminum oxide, silicon dioxide, zirconium silicate, and the like are suitable particular refractories for mold elements to be used in casting component parts from various aluminum alloys.

The catalyzed thermosetting resin ingredient used in the mold composition must be selected to develop a carbonaceous bond by use of the added method step. Conventional thermosetting resin systems such as amine-catalyzed and acid-catalyzed phenolic and furfuryl alcohol are suitable for the purpose; urea resins and melamines generally are not desirable if a high core fired compressive strength is to be attained. Generally, the above-referenced phenolic resins are cured at a temperature of approximately 400° F.; furfuryl alcohol resin, on the other hand, can be cured at room temperatures over prolonged periods of time (e.g., up to 24 hours) but may optionally be cured at elevated temperatures of approximately 200° F. in considerably less time. Care may be required in the selection of the resin catalyst to avoid incompatibility with the refractory powder ingredient; acid catalysts, for instance, are generally incompatible with alumina.

The herein-described invention has been employed to make mold elements using example compositions such as are set forth particularly in the above-referenced copending application Ser. No. 703,206, filed Jan. 11, 1968. Such compositions were formed substantially as detailed above and afterwards were fired in a nonoxidizing atmosphere to a temperature of 1300° F. to develop a carbonaceous bond between the refractory ingredient particles. The following shrinkage and flatness values were obtained from measurement of the fired mold elements:

| Maximum percent, total shrinkage: | | Maximum flatness deviation in 20″ of length |
|---|---|---|
| 1.31 | inch | 0.003–0.014 |
| 1.10 | do | 0.003–0.005 |
| 0.90 | do | 0.003 |
| 0.96 | do | 0.003 |
| 0.84 | do | 0.003–0.012 |
| 0.92 | do | 0.003 |

Increased mass compaction pressures and reduced resin content to refractory ingredient ratios in the composition function to further improve shape retention and shrinkage properties in the finally fired mold element.

Mold elements made in accordance with the instant invention may be readily removed from solidified castings. It is only necessary to expose the casting and mold element combination to an oxygen-containing atmosphere (e.g., air) at a temperature in the range of 800° F. to 1000° F. The developed carbonaceous bond between refractory particles is destroyed and the released refractory ingredient may then be conveniently processed for subsequent reuse.

I claim:

1. Apparatus for forming mold elements from a composition that includes uncured thermosetting resin, and comprising in combination:
  a. Peripherally restrained flexible diaphragm means that is activated from a retracted condition to an injection and compaction condition by pressurized fluid;
  b. Heated die means having a cavity that is positioned above and aligned vertically with respect to said flexible diaphragm means;
  c. Clamping means for securing the periphery of said flexible diaphragm means and to said heated die means fixedly with respect to each other;
  d. Supply means providing pressurized fluid at a pressure of at least approximately 100 p.s.i. to activate said flexible diaphragm means to said injection and mass compaction condition; and
  e. Frame means rotatably supporting said heated die means apart from said clamping means, said heated die means being rotatable from a first condition through approximately 180° to a second condition for clamping wherein said heated die means cavity is inverted for receiving uncured mold element compositions in a direction from said flexible diaphragm means, and said flexible diaphragm means being capable of supporting a required quantity of uncured mold element composition in spaced-apart relation to said heated die means cavity when in said retracted condition, and injecting and compacting said uncured mold element composition into contacting relation to said heated die means cavity when activated to said injection and compaction condition by pressurized fluid provided by said supply means.